United States Patent
Lee et al.

(10) Patent No.: US 7,475,074 B2
(45) Date of Patent: Jan. 6, 2009

(54) WEB SEARCH SYSTEM AND METHOD THEREOF

(75) Inventors: Yao-Chin Lee, Hsinchu (TW); Wen-Cheng Chin, Hsinchu (TW); Chih-Yee Chen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 739 days.

(21) Appl. No.: 11/063,277

(22) Filed: Feb. 22, 2005

(65) Prior Publication Data
US 2006/0190446 A1 Aug. 24, 2006

(51) Int. Cl.
*G06F 17/30* (2006.01)
(52) U.S. Cl. .............. 707/10; 707/1; 707/2; 707/3; 707/100; 707/200
(58) Field of Classification Search .......... 707/1, 707/2, 3, 10, 100, 200
See application file for complete search history.

(56) References Cited

U.S. PATENT DOCUMENTS 5,848,407 A * 12/1998 Ishikawa et al. ............... 707/2
2003/0120639 A1* 6/2003 Potok et al. .................... 707/3

* cited by examiner

*Primary Examiner*—Pierre M Vital
*Assistant Examiner*—Fred I Ehichioya
(74) *Attorney, Agent, or Firm*—Thomas, Kayden, Horstemeyer & Risley

(57) ABSTRACT

A system and method thereof for web search. A server comprises a storage device and a first program module. The storage device stores word count records. Each word count record has information regarding occurrences of words in short passages which have been referenced by a user. The first program module receives a user ID and a keyword, acquires multiple HTML documents corresponding the keyword, calculates a first value for each HTML document according to the word count records corresponding to the user ID, arranges multiple items corresponding to the HTML documents according to the first values thereof in descending order, and displays a web page comprising the ordered items.

14 Claims, 10 Drawing Sheets

| User ID | Word | Count |
|---|---|---|
| A | quality | 40 |
| A | yield | 10 |
| A | revenue | 1 |
| A | sale | 1 |
| B | quality | 1 |
| B | yield | 1 |
| B | revenue | 40 |
| B | sale | 10 |

WEB SEARCH SYSTEM AND METHOD THEREOF

BACKGROUND

The present invention relates to information retrieval technology, and more particularly, to a method and system of web search.

The World Wide Web, together with other resources available over the Internet, provide a mechanism by which users, using computers or other information access devices, can obtain large amounts of information about a wide variety of subjects from a large number of web sites. Generally, information provided by web sites is in the form of Web pages, generally in HTML (HyperText mark-up language) format, which is a text-based format that describes how the respective Web page is to be displayed by a computer, and provides textual information, typically in ASCII form, and graphical information generally in a compressed format such as "GIF" or "JPEG." In addition, a Web page will typically have hypertext links to other Web pages which may be provided by the same site as the original Web page, as well as other Web pages which may be provided by other web sites.

The Internet has over ten billion Web pages, and is still rapidly growing. To find suitable information, there are at least two basic approaches: using a search engine or a search directory such as Yahoo®, LookSmart®, or Open Directory®. Search Directories are useful when browsing general topics, and search engines work well when searching for specific information. Results can be improved by spending time learning the advanced search features of several search tools (usually found on Help pages at each site).

Most search engines maintain huge databases of web sites that can be searched by entering some text, phrases or sentences in a text field of a web page. It is a full-text index that searches the entire HTML file. To index their databases, search engines rely on computer programs called "robots" or, more specifically, "spiders." These programs "crawl" across the web by following links from site to site and indexing each site they visit. Each search engine uses its own set of criteria to decide what to include in its database. For example, some search engines index each page in a web site, while others index only the main page. Currently, one of the most famous search engines, Google, indexes over 3 billion web pages.

Almost all search engines do keyword searches against a database of Web pages, but various factors influence the results of each search, such as, size of the search engine's database, frequency of the database updates, search capability and design, and speed. Google® offers both simple and advanced search capabilities. Advanced searching allows the search to be limited by including or excluding desired words or phrases, and allows for language-specific requests. FIG. 1 illustrates a conventional search result screen. The search result contain hundreds to thousands of resulting items individually comprising a title with a URL linked to a particular Web page 101a or 101b, a short passage (e.g., an abstract or highlighted search keywords) 102a or 102b, a file size in bytes 103a or 103b, and others.

Such numerous resulting items are difficult to efficiently browse, thus, many ranking techniques have been introduced to move irrelevant items lower on the list. One of the main rules in a ranking algorithm involves the location and frequency of keywords on a Web page. Search engines typically predetermine whether the search keywords appear near the top of a web page, such as in the headline or in the first few paragraphs of text. The search engine assumes that any page relevant to the topic will mention those words at or near the beginning thereof. Frequency is another major factor in how search engines determine relevancy. Most search engines analyze how often search keywords appear in relation to other words in a web page. Those with a higher frequency are often more relevant than other web pages.

Although the solution is feasible, several problems remain. Specifically, conventional ranking algorithms are based on the model of location and frequency of keywords to determine the order of resulting items without considering such important factors as user browsing behavior. It is contemplated that users often select one or more resulting items according to the displayed short passages. Therefore, a need exists for a different system and method of Web search.

SUMMARY

It is therefore an object of the present disclosure to provide a system and method of Web search that considers previous browsing behavior and provides an intelligent rank calculation basis for each resulting item, thereby moving irrelevant items lower on the list.

According to an embodiment of the invention, the system includes a server and client computers. The server is connected via a communication network with a number of client computers. Each client computer can be equipped with a browser to gain access to the server. The web browser is a client application or, preferably, an integrated operating system utility that communicates with the server. The web browser 180 receives content from the server sent over the Internet that is typically encoded in Hyper Text Markup Language (HTML), Extensible Markup Language (XML) or the like.

The server includes a processing unit, a memory, a storage device, an input device, a display device and a communication device. The storage device stores multiple "stop words" and word count records. Stop words (e.g., noise words) are words that are irrelevant to the web search. The word count records store information regarding occurrences of words in short passages which have been referenced by a particular user. Each word count record comprises a previously established user identity (ID), a word and a count value.

The memory preferably comprises a calculation module and a search module, which include routines to perform word calculation and web search functions respectively. The calculation module is activated when a user clicks a hyperlink corresponding to a short passage. The calculation module is responsible for calculating word counts in the short passage and accordingly updating the word count records. The search module is activated when a user inputs one or more keywords into a text box and clicks a search button. The search module generates search results based on the word count records.

The calculation module receives a user ID and an interface event of a hyperlink, and acquires a short passage corresponding to the hyperlink. The calculation module removes certain words from the short passage using a stop word filtering (e.g., noise word filtering) algorithm to generate another short passage. Predefined stop words are stored in the storage device. The calculation module sequentially scans the short passage corresponding to the hyperlink to obtain words therein. For each word, the calculation module detects whether the word with the received user ID is present in a word count record, if so, it increases the count value of the matched word count record by one; otherwise, it creates a new word count record comprising the obtained word and the user ID, and sets the count value to 1.

The search module receives a user ID and one or more keywords. The search module also acquires multiple HTML documents corresponding to the input keyword(s). For each HTML document, the search module acquires words and their counts corresponding to the user ID from the word count records. The search module then calculates a matching score (MS) for the HTML document. The search module generates a web page containing resulting items. Preferably, each item comprises a display title with a URL linked to the particular HTML page, a short passage, a file size in bytes, or others. The resulting items are preferably arranged according to the MS values in descending order.

BRIEF DESCRIPTION OF THE DRAWINGS

The aforementioned objects, features, and advantages will become apparent by referring to the following detailed description of the preferred embodiment with reference to the accompanying drawings, wherein:

FIG. 4 is a diagram showing exemplary word count records;

DESCRIPTION

Figure 2:
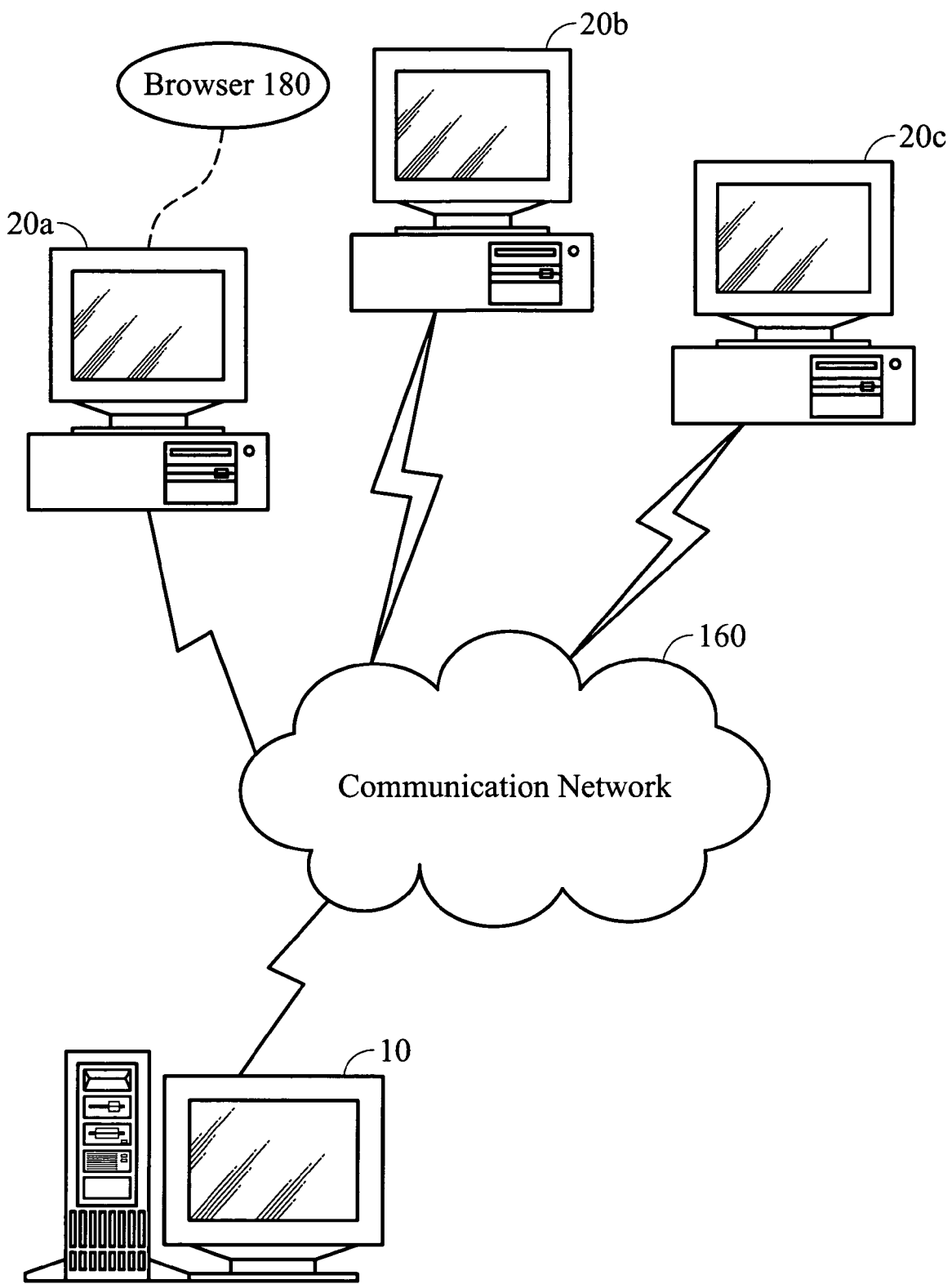
FIG. 2 is a diagram of the architecture of the Web search system.

FIG. 2 is a diagram of the architecture of the Web search system. According to FIG. 2, the system preferably includes a server 10, and client computers 20a, 20b and 20c. The server 10 is connected via a communication network 160 (which may be a LAN, WAN, intranet or the Internet) with a number of client computers 20a, 20b, 20c or others. In a network environment where the communication network 160 is, for example, the Internet, the server 10 can be a Web server with which the clients 20 communicate via any of a number of known protocols, such as hypertext transfer protocol (HTTP), or others. Each client computer 20 can be equipped with a browser 180 to gain access to the server 10. The web browser 180 is a client application or, preferably, an integrated operating system utility that communicates with the server 10. The web browser 180 receives content from the server 10. The content is sent over the Internet, and is typically encoded in Hyper Text Markup Language (HTML), Extensible Markup Language (XML), or the like. Such HTML documents may include scripts (e.g., JavaScript or Visual Basic Scripts) that provides for some basic functionality. The web browser 180 typically supports additional components such as Java Applets, ActiveX Controls and Plug-Ins that provide extra functionality.

Figure 3:
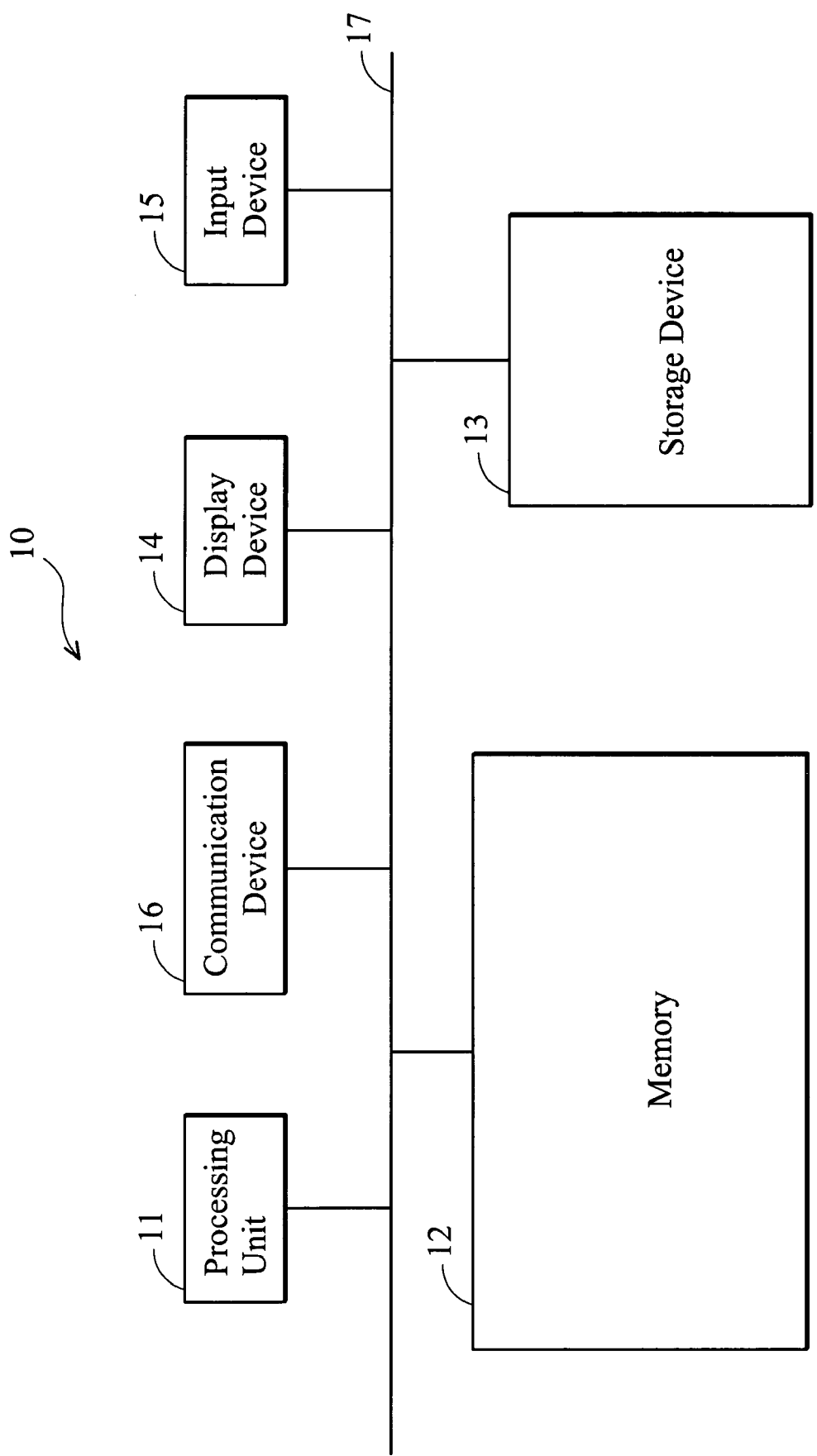
FIG. 3 is a diagram of the architecture of the server.

FIG. 3 is a diagram of the architecture of the server. The server 10 includes a processing unit 11, a memory 12, a storage device 13, an input device 14, a display device 15 and a communication device 16. The processing unit 11 is connected by buses 17 to the memory 12, storage device 13, input device 14, display device 15 and communication device 16 based on, for example, Von Neumann architecture. The processing unit 11, memory 12, storage device 13, display device 14; input device 15, and communication device 16 may be conventionally incorporated to a mainframe computer, a mini-computer, a workstation computer, a host computer, a personal computer, or a mobile computer.

The processing unit 11, controlled by instructions from the memory 12 and an operator through the input device 14, executes job queue management functions. There may be one or more than one processing units 11, such that the processor of the computer 10 comprises a single central processing unit (CPU), or multiple processing units, commonly referred to as a parallel processing environment.

The storage device 13 can be implemented as a database system, a file, or the like, to store multiple "stop words" and word count records. Stop words (e.g., noise words), such as "the", "is", "are" or others, are irrelevant words for a web search. The word count records store information regarding occurrences of words in short passages which have been referenced by a particular user. Each word count record comprises a previously established user identity (ID), a word and a count value. The user ID maybe with reference to a computer ID, a user account, or the like, to distinguish users. The implementation of the word count record described above is not limited to a single table/file, but also to multiple related tables/files. Consistent with the scope and spirit of the invention, additional or different fields may be provided. Details of the calculation of word counts are further described as follows.

FIG. 4 is a diagram showing exemplary word count records. Referring to records 41a to 41d, short passages comprising words "quality", "yield", "revenue", and "sale" have been referred by user "A", and the occurrences of those words are 40, 10, 1 and 1. Alternatively, referring to records 42a to 42d, short passages comprising the same words have been referenced by user "B", and the occurrence of those words are 1, 1, 40, and 10. In this example, the exemplary word count records may indicate that user "A" intends to acquire information about quality control, while user "B" intends to search for information about marketing.

Figure 1:
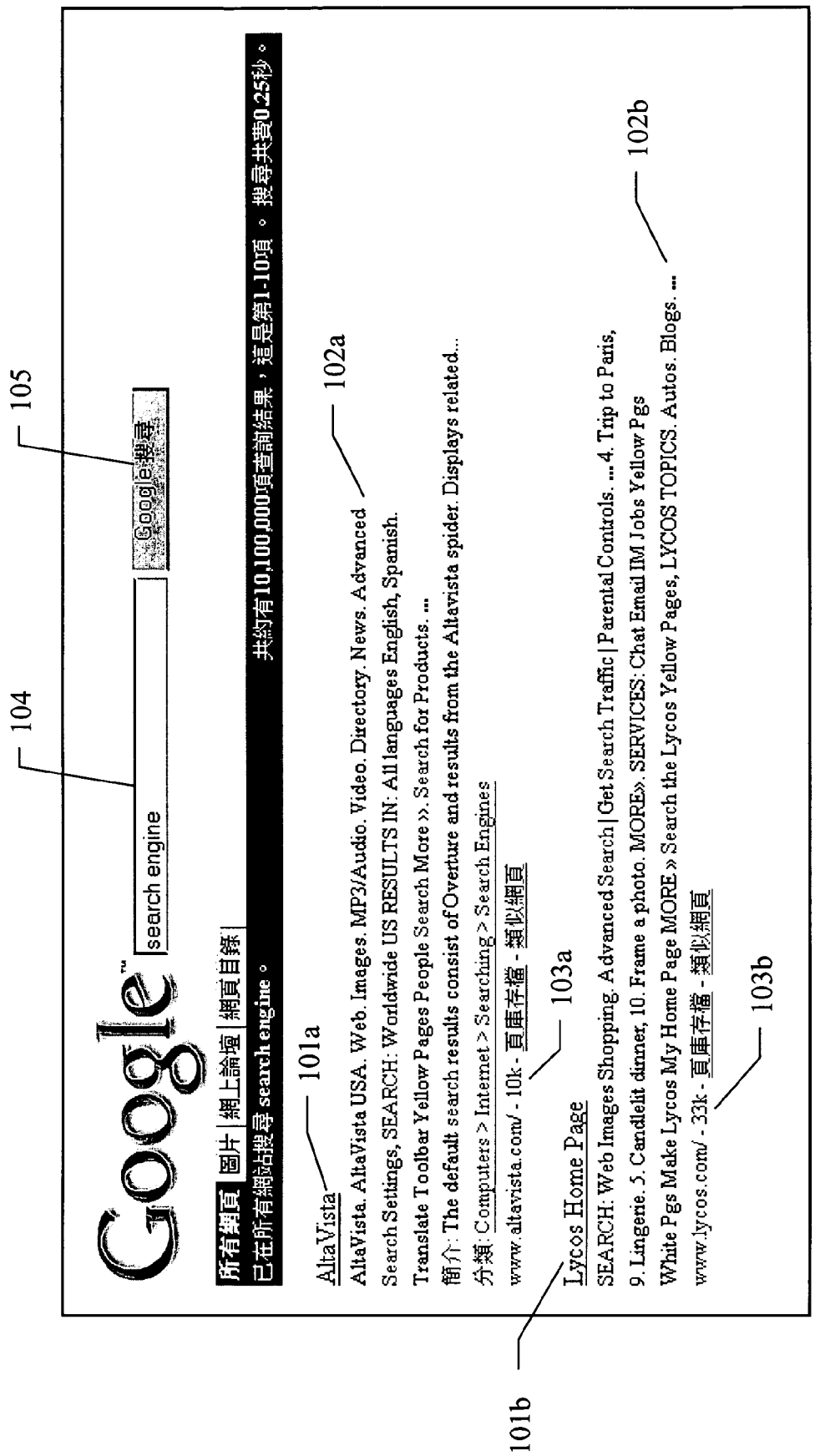
FIG. 1 illustrates a conventional search result screen.
Figure 5:
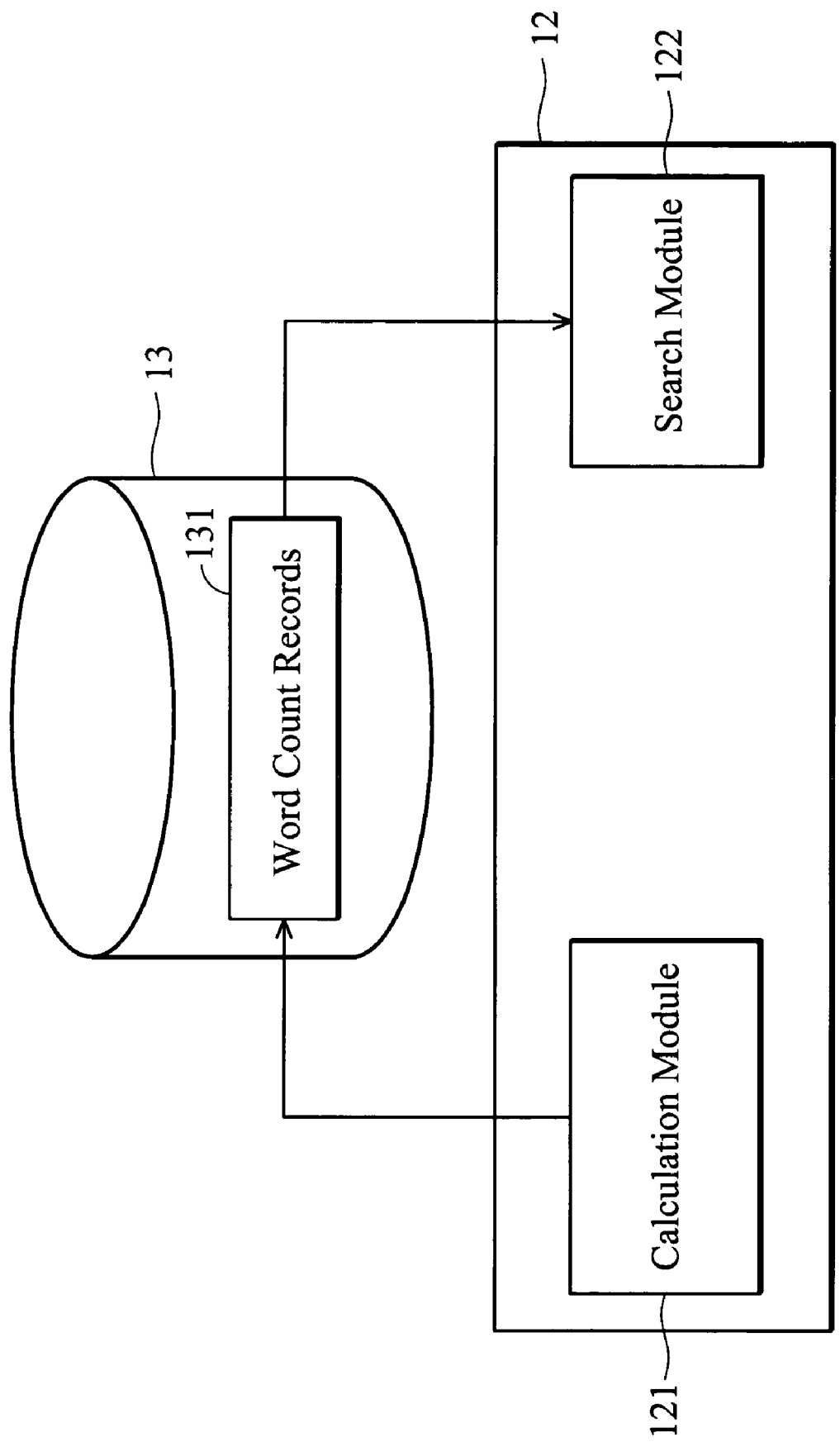
FIG. 5 is a diagram of the software architecture of the server according to the invention.

FIG. 5 is a diagram of the software architecture of the server. The memory 12 is preferably a random access memory (RAM), but may also include read-only memory (ROM) or flash ROM. The memory 12 preferably includes a calculation module 121 and a search module 122, which include routines for performing word calculation and web search functions respectively. The storage device 13 preferably includes word count records 131. For example, referring to FIG. 1, the calculation module 121 is activated when a user clicks hyperlink 101a or 101b respectively corresponding to short passage 102a or 102b. The calculation module 121 is responsible for calculating word counts in the short passage 102a or 102b, and updating the word count records 131 accordingly. The search module 122 is activated when a user inputs one or more keywords into a text box 104 and clicks a search button 105. The search module 122 is responsible for generating search results based on the word count records 131.

Figure 6B:
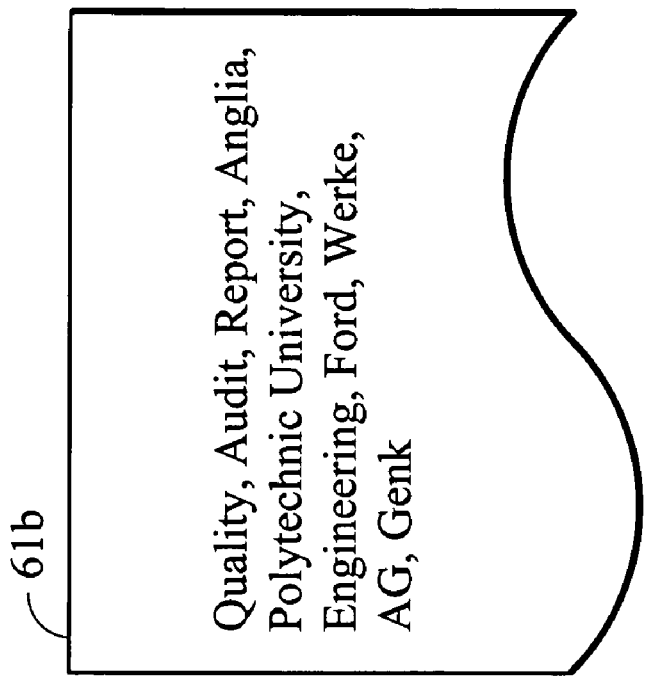
FIGS. 6a and 6b are diagrams of exemplary short passages according to the present invention.
Figure 6A:
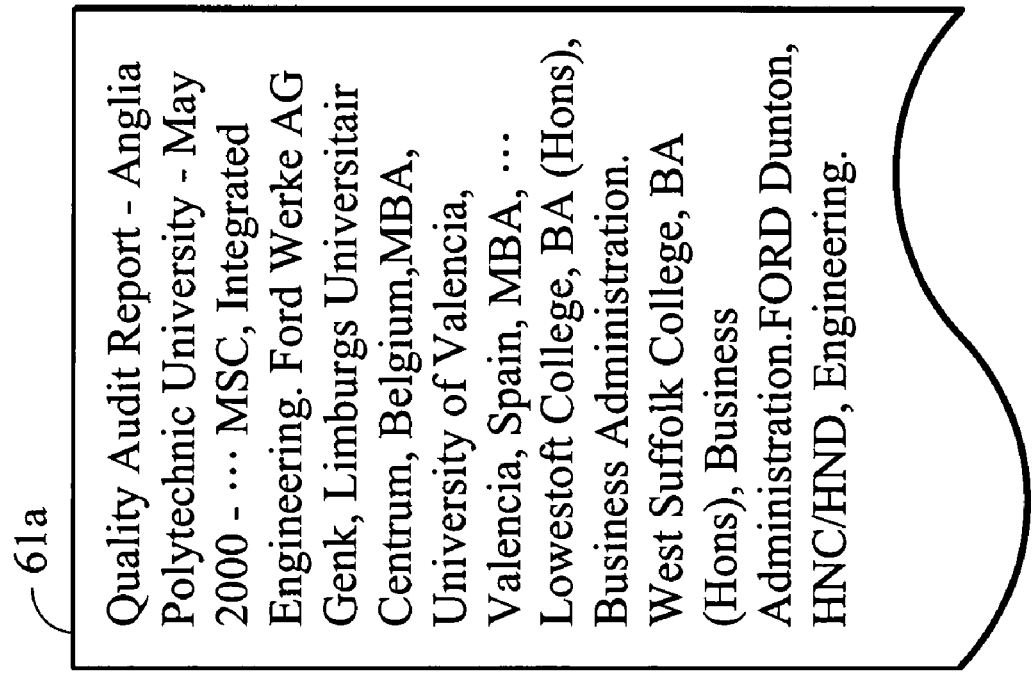

FIG. 6a and 6b are diagrams of exemplary short passages. The calculation module 121 may be implemented in one or more script functions, such as JavaScript, VB Script, or others, embedded in a web page. The calculation module 121 may also be implemented as a component or object resident in the system 10 or another remote computer. The calculation module 121 begins to receive a user ID and an interface event of a hyperlink. The interface event can be, for example, a "click", "double-click" or the like. The calculation module then acquires a short passage 61*a* corresponding to the hyperlink. The calculation module 121 removes certain words from the short passage 61*a* using stop word filtering (e.g., noise word filtering) algorithm to generate another short passage 61*b*. The predefined stop words are stored in the storage device 13. The stop word filtering algorithm is well known in the art. The calculation module 121 sequentially scans the short passage 61*b* to obtain words therein. For each word, the calculation module 121 detects whether the word with the received user ID is present in a word count record, if so, it increases the count value of the matched word count record by one. Otherwise, it creates a new word count record comprising the obtained word and the user ID, and sets the count value therein to 1.

The search module 122 may implemented in one or more script functions, such as JavaScript, VB Script, or others, embedded in a web page. The search module 122 can also be implemented as a component or object resident in the system 10 or another remote computer. The search module 122 receives a user ID and one or more keywords. Thereafter, the search module 122 acquires multiple HTML documents corresponding to the input keyword/keywords. The HTML document search algorithm according one or more keywords is well known in the art. For each HTML document, the search module 122 acquires words and their counts corresponding to the user ID from the word count records. The search module 122 then calculates a matching score (MS) for the HTML document. Equation (1) shows one formula for calculating the matching score.

Equation (1):

$$MS = \sum_{i=1}^{n} P(Wi) * C(Wi),$$

where MS represents the matching score for the HTML document, n represents the sum of the word count records corresponding to the user ID, P(Ki) represents the occurrence of the (i)th word in the HTML document and C(Wi) represents the count of the (i)th word in the word count record. The search module 122 generates a web page containing resulting items. Preferably, each resulting item comprises a display title with a URL linked to the particular HTML page, a short passage, a file size in bytes, or others. The resulting items are preferably arranged according to the MS values in descending order.

Figure 7:
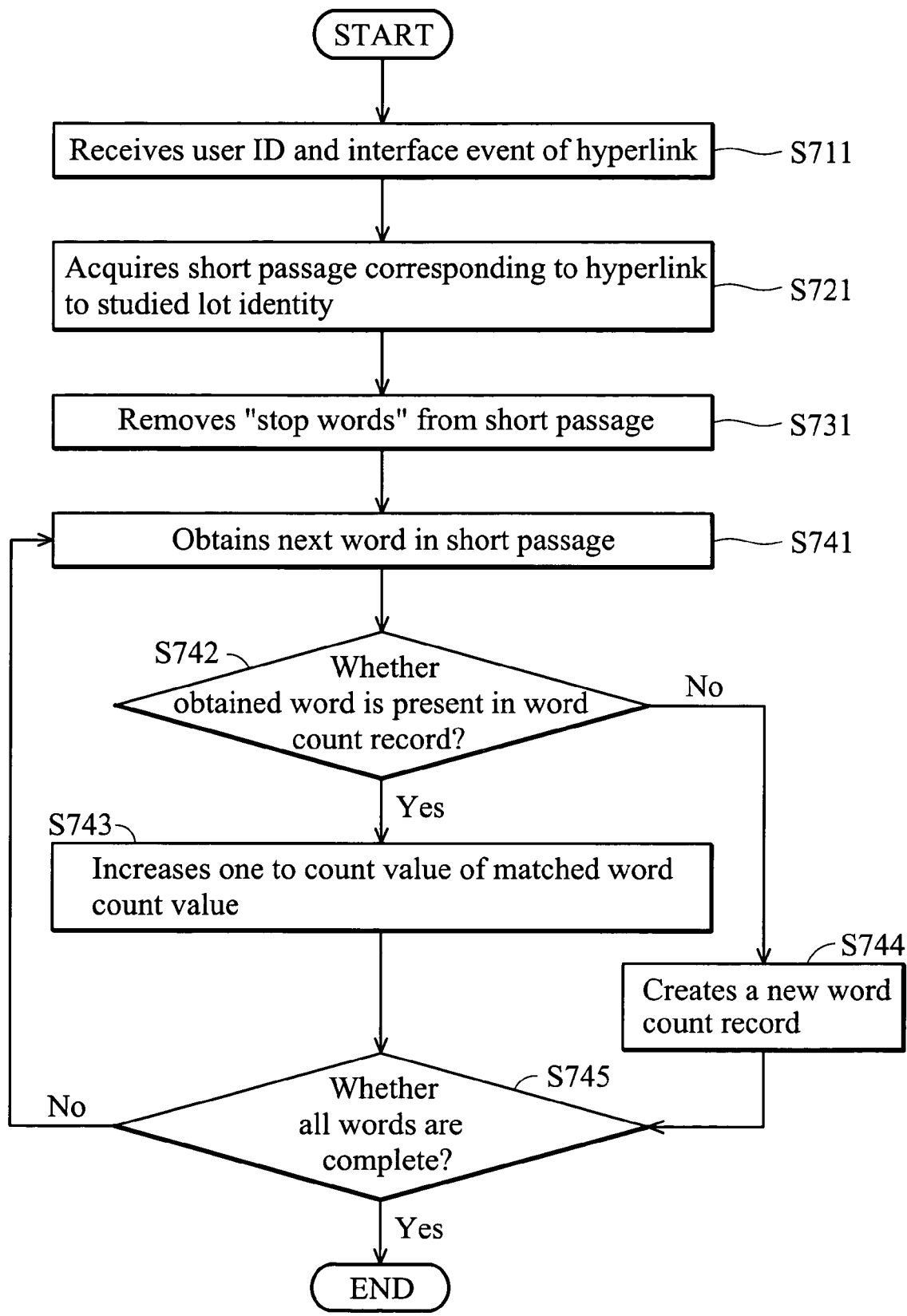
FIG. 7 is a flowchart of a method for short passage word calculation according to one embodiment of the present invention.

FIG. 7 is a flowchart showing a method of short passage word calculation according to one embodiment of the present invention. The process begins in step S711 to receive a user ID and an interface event of a hyperlink. The interface event can be a "click", "double-click" or the like. In step S721, a short passage 61*a* (FIG. 6*a*) is acquired. In step S731, stop words (e.g., noise words) are removed from the short passage using stop word filtering (e.g., noise word filtering) algorithm, thereby generating another short passage 61*b* (FIG. 6*b*). Next, a loop comprising steps S741 to S745 is used for calculation of all words in the short passage 61*b*. Step S741, a start point of the loop, obtains a next word in the short passage 61*b*. Step S742 determines whether the obtained word is present in the word count records. If the word is present in the word count records, then the process proceeds to step S743. If the word is not present in the word count records, then the process proceeds to step S744. In step S743, the count value of the matched word count record is increased by one. In step S744, a new word count comprising the obtained word and the user ID is created. The count value therein is set to one. Step S745 determines whether all words in the short passage 61*b* are obtained completely. If all words are obtained, then the process ends. Otherwise, the process proceeds to step S741, the start point of the loop, to obtain another next word in the short passage 61*b*.

Figure 8:
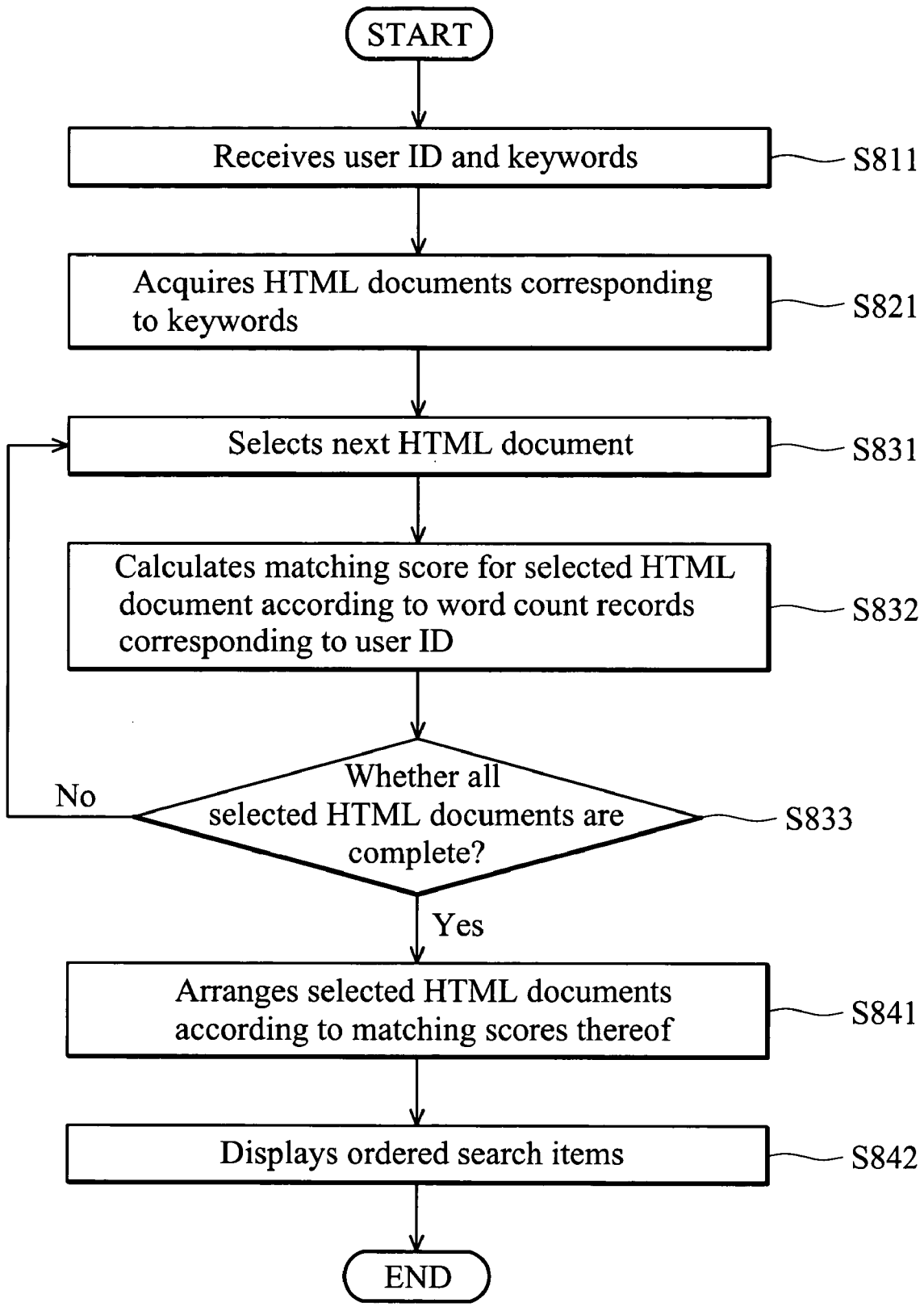
FIG. 8 is a flowchart of a method for searching HTML documents according to another embodiment of the present invention.

FIG. 8 is a flowchart showing a method of HTML document search according to another embodiment of the present invention. The process begins in step S811 to receive a user ID and one or more keywords. In step S821, multiple HTML documents corresponding to the keywords are acquired. Next, a loop comprising steps S831 to S833 is used to calculate a matching score for the selected HTML documents. Step S831, a start point of the loop, selects a next HTML document. Step S832 calculates a matching score for a selected HTML document according to word count records corresponding to the received user ID. The calculation may be performed by equation (1). Step S833 determines whether the matching score has been calculated for all obtained HTML documents. If all matching scores have been calculated, then the process proceeds to step S841. Otherwise, the process proceeds to step S831, the start point of the loop, to obtain another HTML document. In step S841, all selected HTML documents are arranged according to the matching scores thereof, preferably in descending order. In step S842, a web page containing reordered items is displayed on the display device 14. Preferably, each record item comprises a title with a URL linked to the particular HTML page, a short passage, a file size in bytes, or others.

Figure 9:
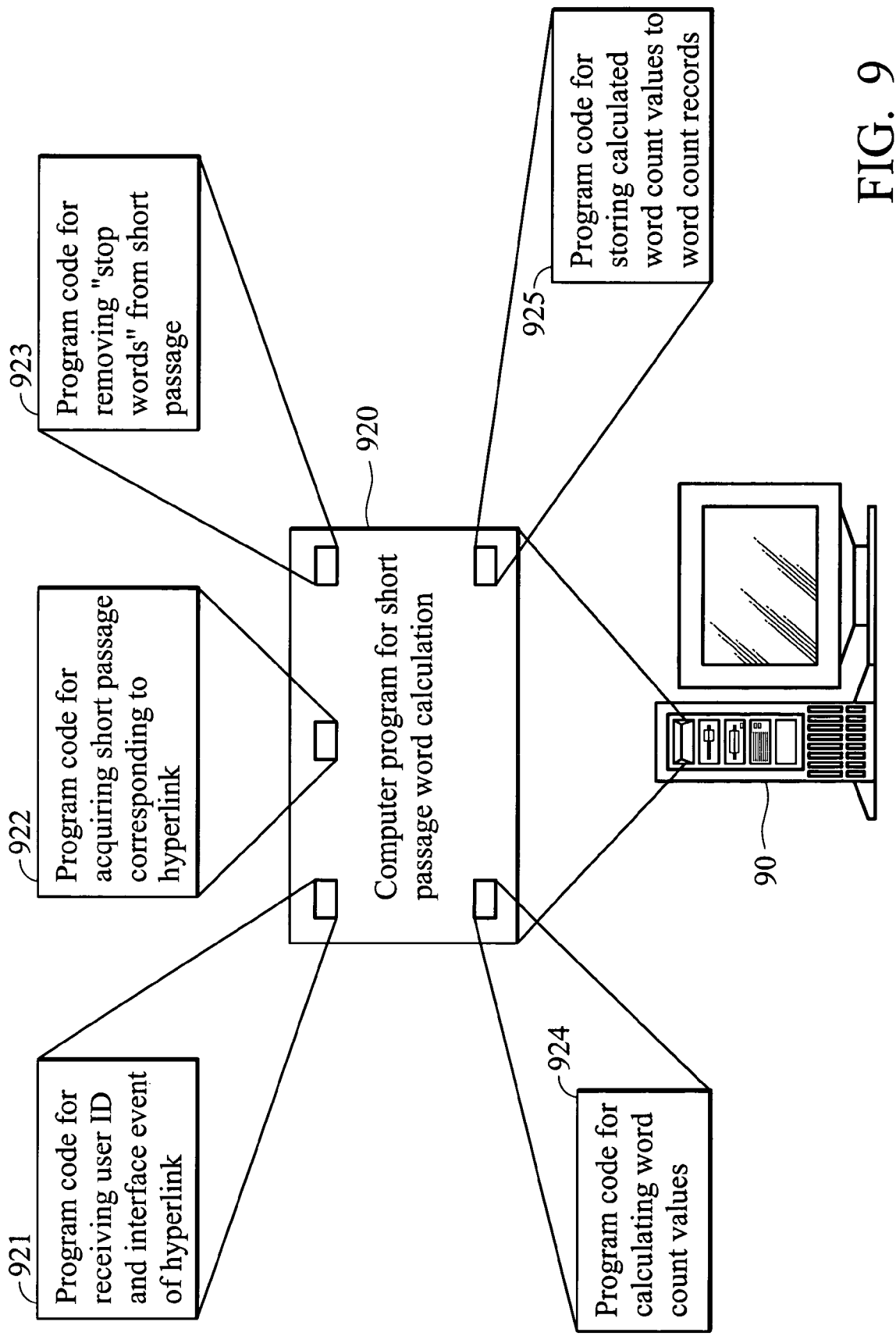
FIG. 9 is a diagram of a storage medium for storing a computer program providing the method of short passage word calculation.

FIG. 9 shows a storage medium that stores a computer program 920 that provides the disclosed method of short passage word calculation. The program is stored on a storage medium 90 for use in a computer system. The computer comprises computer readable program code 921 for receiving a user ID and an interface event of a hyperlink. The program also comprises computer readable program code 922 for acquiring short passage corresponding to the hyperlink. Additionally, the program includes computer readable program code 923 for removing "Stop Words" from the short passage. Moreover, the program comprises computer readable program code 924 for calculating word count values. Furthermore, the program comprises computer readable program code 925 for storing calculated word count values to word count records.

Figure 10:
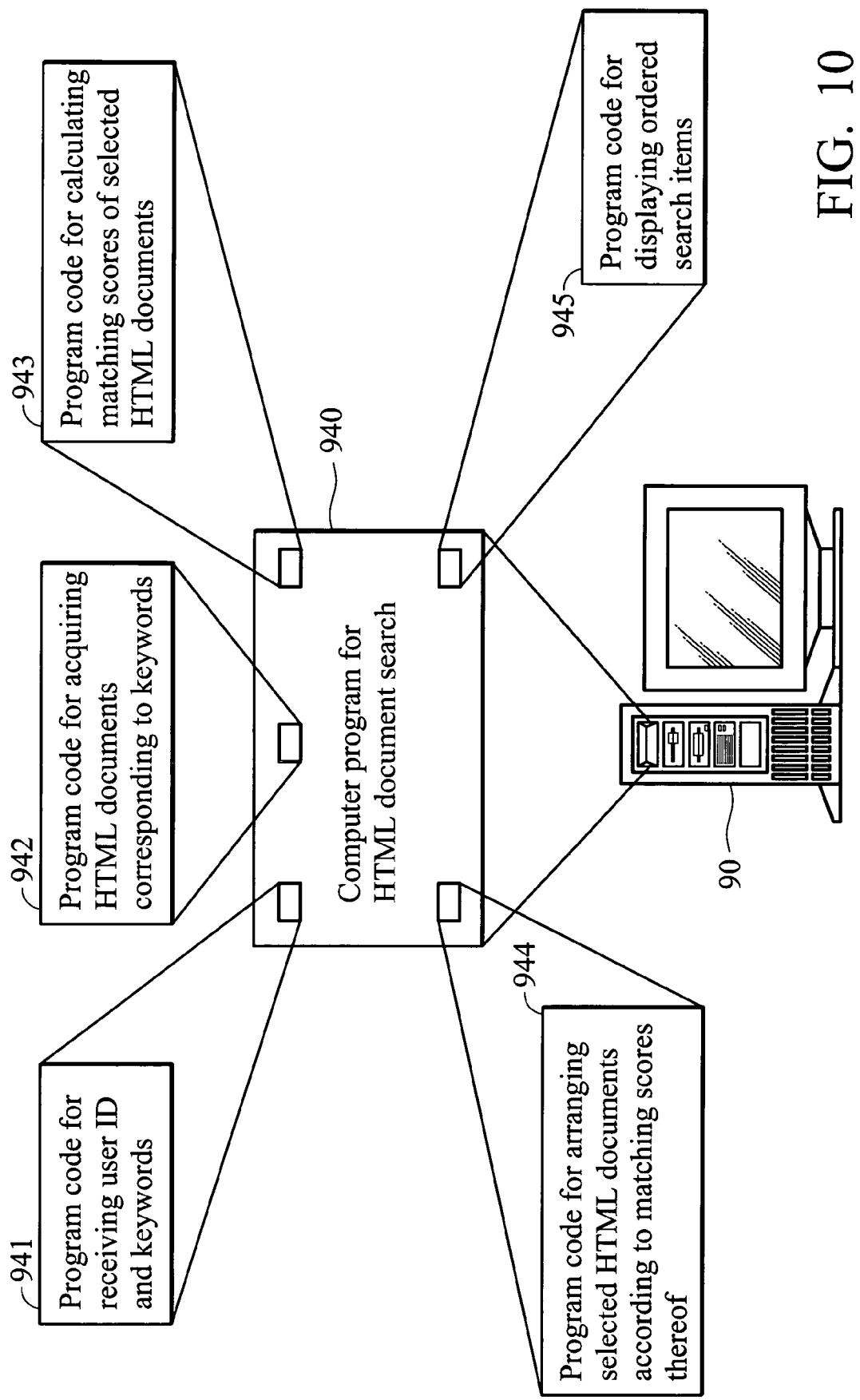
FIG. 10 is a diagram of storage medium for another computer program providing the method for searching HTML documents.

FIG. 10 shows another computer-readable medium that stores a computer program 940 for providing the disclosed method of web search. The storage medium 90 has a program code embodied in the medium for use in a computer system. The program comprises computer readable program code 941 for receiving a user ID and search keywords. Moreover, the program includes computer readable program code 942 for acquiring HTML documents corresponding to the search keywords. The program also comprises computer readable program code 943 for calculating matching scores of selected HTML documents. Furthermore, the program comprises computer readable program code 944 for arranging selected HTML documents according to matching scores thereof. The program further comprises computer readable program code 945 for displaying a result. The result comprises ordered search items.

The methods and system of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although several embodiments of the present invention has been described in its preferred embodiments, it is not intended to limit the invention to the precise embodiments disclosed herein. Those who are skilled in this technology can still make various alterations and modifications without departing from the scope and spirit of this disclosure. Therefore, the scope of the present invention shall be defined and protected by the following claims and their equivalents.

What is claimed is:

1. A system for web search, employed in a computer network system comprising:
   a storage device capable of storing a plurality of word count records, each word count record having information regarding occurrences of words in a plurality of short passages, each short passage having been referenced by a user;
   a first program module configured to receive a user ID corresponding to the user, the first program module further being configured to receive a keyword, the first program module further being configured to acquire a plurality of HyperText Transfer Language (HTML) documents, the HTML documents corresponding to the keyword, the first program module further being configured to calculate a first value for each HTML document, the first value being calculated according to the word count records corresponding to the user ID, the first program module further being configured to arrange a plurality of items, the items being arranged in descending order according to the first values, the first program module further being configured to display a web page, the web page comprising the ordered items; and
   a second program module configured to receive the user ID, the second program module further being configured to receive an interface event of a hyperlink, the second program module further being configured to acquire a short passage corresponding to the hyperlink, the short passage comprising a plurality of words, the second program module further being configured to calculate a count value for each word, the second program module further being configured to store the count value with the word and the user ID, the count value being stored to the word count record.

2. The system of claim 1, wherein the word count record comprises a user ID, a word, and a count value.

3. The system of claim 1, wherein the item comprises a display title with a URL linked to a particular HTML document, a displayed short passage, and a file size in bytes.

4. The system of claim 1, wherein the computer network system further comprising a client, the client having a web browser, the client communicating with the server for a web search.

5. The system of claim 1, wherein the second program module removes stop words from the short passage using a stop word filtering algorithm, the stop words being predefined.

6. The system of claim 5:
   wherein the second program module is configured to detect whether the word with the user ID is present in the word count record; and
   wherein, if the word with the user ID is not present in the word count record:
   the second program module is further configured to create a new word count record comprising the word and the user ID; and
   the second program module is further configured to set a count value of the new word count record to one.

7. The system of claim 5:
   wherein the second program module is configured to detect whether the word with the user ID is present in the word count record; and
   wherein, if the word with the user ID is present in the word count record, the second program module is further being configured to increases the count value of the matched word count record by one.

8. A method of web search, the method comprising using a computer to perform the steps of:
   receiving a user ID corresponding to a user;
   receiving a keyword;
   acquiring a plurality of HTML documents corresponding the keyword;
   receiving an interface event of a hyperlink:
   acquiring a short passage corresponding to the hyperlink, the short passage comprising a plurality of words;
   calculating a first value for each HTML document according to a plurality of word count records corresponding to the user ID, the word count record having information regarding occurrences of words in a plurality of short passages, each short passage having been referenced by the user;
   calculating a count value for each word; and
   storing the count value to the word count record, the count value being stored with the word and the user ID;
   arranging a plurality of items corresponding to the HTML documents, the plurality of items being arranged in descending order according to their first values; and
   displaying a web page comprising the arranged plurality of items.

9. The method of claim 8, wherein the word count record comprises a user ID, a word, and a count value.

10. The method of claim 8, wherein the item comprises a display title with a URL linked to a particular HTML document, a displayed short passage, and a file size in bytes.

11. The method of claim 8, further comprising the step of removing predefined stop words from the short passage using a stop word filtering algorithm.

12. The method of claim 11, further comprising the steps of:
    detecting whether the word with the user ID is present in the word count record;
    in response to detecting that the word with the user ID is not present in the word count record:
    creating a new word count, the new word count record comprising the word and the user ID; and
    setting the count value of the new word count record to one.

13. The method of claim 11, further comprising the steps of:
    detecting whether the word with the user ID is present in the word count record;

in response to detecting that the word with the user ID is present in the word count record, increasing a count value of the word count record by one.

14. The method of claim 13, further comprising the steps of:

detecting whether the word with the user ID is present in the word count record;

in response to detecting that the word with the user ID is not present in the word count record:

creating a new word count, the new word count record comprising the word and the user ID; and setting the count value of the new word count record to one.

* * * * *